T. GALT.

Improvement in Perambulators.

No. 129,941.                  Patented July 30, 1872.

WITNESSES
John Becker
C. Sedgwick

INVENTOR
T. Galt
pr. Munn & Co
Attorneys

UNITED STATES PATENT OFFICE.

THOMAS GALT, OF ROCK ISLAND, ILLINOIS.

IMPROVEMENT IN PERAMBULATORS.

Specification forming part of Letters Patent No. 129,941, dated July 30, 1872.

Specification describing a new and Improved Perambulator, invented by THOMAS GALT, of Rock Island, in the county of Rock Island and State of Illinois.

Figure 1:
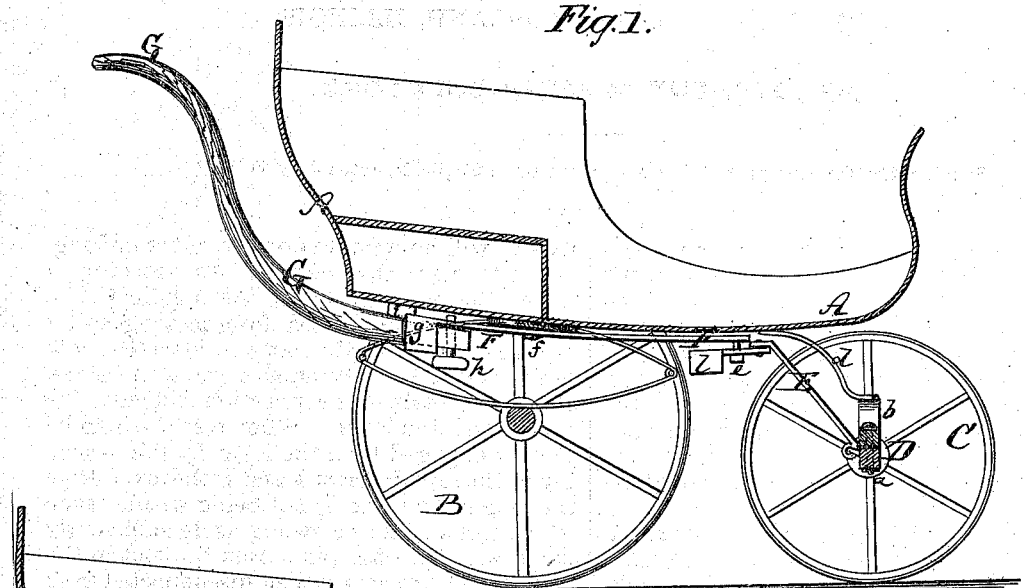
Figure 2:
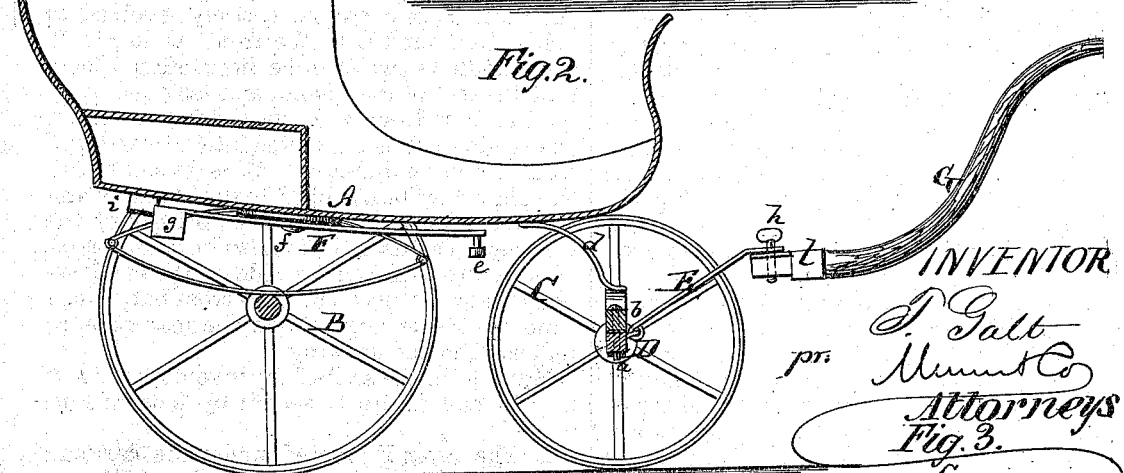
Figure 3:
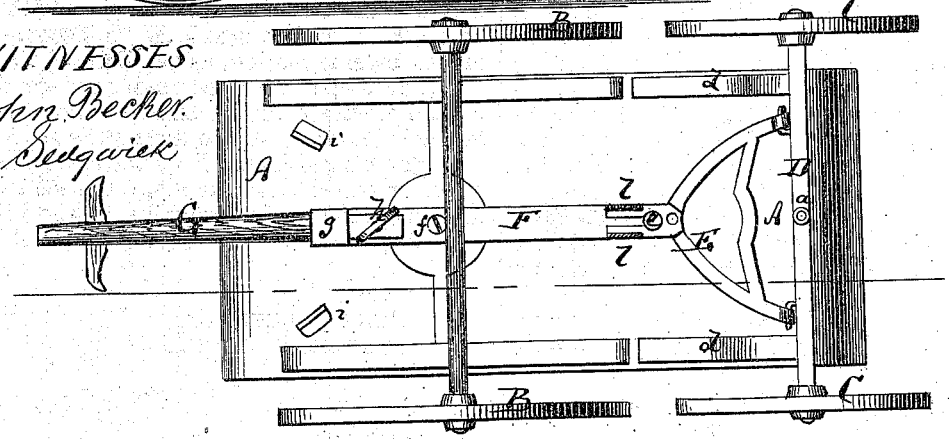

Figure 1 represents a sectional side view of my improved perambulator. Fig. 2 is a sectional side view of the same, showing the handle reversed; and Fig. 3 is a bottom view of the same.

Similar letters of reference indicate corresponding parts.

This invention relates to a new perambulator whose handle is connected with the front axle, to steer by means of the front wheels. The invention consists in a new manner of connecting the handle with the axle; also, in a reversible feature, which allows the handle to be applied to the front of the vehicle to convert it into a four-wheeled carriage that is drawn forward instead of pushed. The invention also consists in the use of stops on the under side of the carriage for arresting the perambulator-handle during the side motion, and preventing it from becoming disconnected from the axle.

A in the drawing represents the body of the carriage or perambulator. It is in rear supported by wheels B B, and in front by wheels C C. The front wheels are hung to the front axle D, which is at $a$ pivoted to the body A or to a cross-bar, $b$—that is, by springs $d$ $d$ connected with the body A. From the axle D projects backward a hinged hound, E, whose extreme end is slotted and caused to straddle a pin, $e$. This pin projects from the front end of a lever, F, pivoted at $f$ to the under side of the body A. G is the handle of the perambulator. Its front end is inserted in a loop, $g$, projecting from the rear end of the lever F, and is fastened to the said lever by a thumb-screw, $h$. $i$ $i$ are stops projecting from the under side of the carriage-body for the handle G to strike against during its side motions. Whenever the handle G is moved aside—i. e., vibrated together with or as an extension of the lever F on the pivot $f$—the axle D will be vibrated on its pivot or king-bolt $a$ to steer the vehicle. As the stops $i$ define the side motion of the handle G the lever F is also prevented from moving so far aside as to enable the pin $e$ to leave the slot of the hound E. The stops $i$ serve, therefore, chiefly to retain the connection between the hound and the lever. Whenever the handle G is disengaged from the lever by the loosening of the thumb-screw $h$ and withdrawal from the loop $g$ the lever F, not being within reach of the stops $i$, can be swung aside sufficiently far to withdraw the pin $e$ from the slot in the hound. The axle D is then disconnected from the lever F, and can be entirely revolved to bring the hound E to the front, as in Fig. 2. The handle G can then be inserted in a loop, $l$, at the end of the hound, and fastened there by the thumb-screw $h$, as shown in Fig. 2. The device is then converted into a "carriage" from a "perambulator." It is evident that the pin $e$ may be attached to the hound E and the slot formed on the lever F, instead of the reverse. The lever F, instead of being pivoted directly to the under side of the carriage-body, may be pivoted to a cross-bar, which connects the springs above the rear axle, as indicated in the drawing.

Having thus described my invention, I claim as new and desire to secure by Letters Patent—

1. The lever F pivoted under the carriage A and connected by slot and pin $e$ with the hound E of the front axle D, to become detached by side motion, as set forth.

2. The stops $i$ $i$ formed under the carriage A, and arranged, in combination with the detachable handle G of the lever F, as set forth.

3. The hinged hound E on the front axle D, when provided with the loop $l$ to receive the handle G, and made reversible, as specified.

THOMAS GALT.

Witnesses:
 HENRY CURTIS, Jr.,
 CHARLES W. O'NEIL.